United States Patent
Szedo et al.

(10) Patent No.: US 8,774,544 B1
(45) Date of Patent: Jul. 8, 2014

(54) DETERMINING OUTLIER PIXELS OF SUCCESSIVE FRAMES

(75) Inventors: Gabor Szedo, Longmont, CO (US); Jeffrey D. Stroomer, Lafayette, CO (US); Jose R. Alvarez, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 839 days.

(21) Appl. No.: 12/842,745

(22) Filed: Jul. 23, 2010

(51) Int. Cl.
*G06K 9/40* (2006.01)
*H04N 5/21* (2006.01)

(52) U.S. Cl.
CPC ......... *G06K 9/40* (2013.01); *G06T 2207/10016* (2013.01); *H04N 5/21* (2013.01)
USPC ........................................................ 382/260

(58) Field of Classification Search
USPC ........... 348/218, 246, 280, 300, 372; 382/218
See application file for complete search history.

(56) References Cited

U.S. PATENT DOCUMENTS

| 2001/0015755 | A1* | 8/2001 | Mathews et al. | 348/144 |
|---|---|---|---|---|
| 2004/0032516 | A1* | 2/2004 | Kakarala | 348/246 |
| 2011/0019094 | A1* | 1/2011 | Rossignol et al. | 348/607 |

* cited by examiner

*Primary Examiner* — Amara Abdi
(74) *Attorney, Agent, or Firm* — LeRoy D. Maunu

(57) ABSTRACT

Circuits, systems, and methods for processing outlier pixels include a spatial filter and a temporal filter. The spatial filter is configured to compute a pixel difference for each pixel as a function of a pixel value of the pixel and pixel values of nearby pixels within each frame. The spatial filter is configured to dynamically add the pixel to a candidate list when the pixel difference exceeds a threshold value. The temporal filter dynamically removes a pixel from the candidate list when there is a divergence of a pixel value of the pixel in successive frames. The temporal filter determines a pixel in the candidate list is an outlier pixel when there is no such divergence in the successive frames.

20 Claims, 4 Drawing Sheets

DETERMINING OUTLIER PIXELS OF SUCCESSIVE FRAMES

FIELD OF THE INVENTION

Embodiments of the present invention generally relate to signal processing, and more particularly to video image processing.

BACKGROUND

Video streams can include a sequence of frames of picture elements (pixels). Image sensors can create a video stream that records a particular scene. However, image sensors frequently have defects that temporarily or permanently prevent accurate recording of some pixels of the scene. The defective pixels may become visually distracting when sensor defects produce defective pixels that contrast significantly from the surrounding pixels of the scene.

The embodiments of the present invention may address one or more of the above issues.

SUMMARY

A circuit for processing outlier pixels is described. The circuit includes a spatial filter and a temporal filter. The spatial filter is configured to compute a pixel difference for each pixel as a function of a pixel value of the pixel and pixel values of nearby pixels within each frame. The spatial filter is configured to dynamically add the pixel to a candidate list when the pixel difference exceeds a threshold value. The temporal filter dynamically removes a pixel from the candidate list when there is a divergence of a pixel value of the pixel in successive frames. The temporal filter further determines that a pixel in the candidate list is an outlier pixel when there is no such divergence in the successive frames.

In another embodiment, a sensor produces a video stream that includes each frame, and the sensor defectively detects a pixel of the video stream. The spatial and temporal filters determine the pixel is an outlier pixel when its pixel difference exceeds the threshold value that can be, for example, a square root of a maximum possible value for the pixel value. An interpolator replaces the pixel value of each outlier pixel in each frame with an interpolation of the pixel values of the nearby pixels in the frame.

A FIFO device stores an element for each pixel in the candidate list in another embodiment. An order of elements in the FIFO device matches a sensing order for the pixels within each frame. The spatial filter creates an element in the FIFO device when the pixel difference of the pixel exceeds a threshold value and the FIFO device does not already store the element. The spatial filter creates the element that includes a count initialized to zero and a baseline value initialized to the pixel value of the pixel. The temporal filter reads each element from the FIFO device, discards the element for the divergence of the pixel value of the pixel in the frame being outside a range encompassing the baseline value, and writes the element back into the FIFO device with the count incremented for no such divergence.

In another embodiment, the temporal filter determines that a pixel in the candidate list is an outlier pixel when the count of the element for the pixel exceeds another threshold value. This threshold value is increased when the number of the outlier pixels is more than a predetermined upper limit and this threshold value is reduced when the number of the outlier pixels is less than a predetermined lower limit.

The spatial filter randomly selects an order to dynamically add pixels to the candidate list until the candidate list becomes full in another embodiment.

In another embodiment, the spatial filter computes the pixel difference for each pixel of each frame to be a numerator divided by a denominator. The numerator is a minimum one of eight positive-valued differences between the pixel value of the pixel in the frame and each of the pixel values of the nearby pixels in the frame. The denominator is a standard deviation of the pixel values of the nearby pixels in the frame. Each of the eight positive-valued differences is a square of a difference between the pixel value of the pixel and one of the pixel values of the nearby pixels.

In yet another embodiment, each pixel is associated with a color of a color filtering array covering a sensor that produces each frame in the video stream, and the nearby pixels for each pixel are eight nearest neighbor pixels associated with the same color.

For each pixel in each frame with the pixel difference exceeding the threshold value, the spatial filter dynamically adds a baseline value into the candidate list in another embodiment. The baseline value is the pixel value of the pixel in the frame. The temporal filter compares the baseline value from the candidate list with the pixel value of the pixel in the successive frames to determine whether the pixel value diverges in the successive frames. The divergence for each pixel in the candidate list is when the pixel value of the pixel in a successive frame is outside a range encompassing the baseline value. The range of pixel values is reduced when the candidate list includes too many pixels and the range is increased when the candidate list includes too few pixels.

A method and system for processing outlier pixels using at least one programmed processor are also described. The operations performed by the processor include computing a pixel difference for each pixel within each frame of a video stream as a function of a pixel value of the pixel and pixel values of nearby pixels within the frame, and dynamically adding the pixel to a candidate list when the pixel difference exceeds a threshold value. The operations further include dynamically removing each pixel from the candidate list when a pixel value of the pixel diverges in a successive frame. Each pixel in the candidate list is determined to be an outlier pixel when there is no such divergence in successive frames.

In another embodiment, a count is initialized to zero when the pixel difference of a pixel exceeds the threshold. The count is incremented when there is no divergence, because the pixel value of the pixel in a successive frame is within a range. The pixel is determined to be an outlier pixel when the count exceeds another threshold value.

It will be appreciated that various other embodiments are set forth in the Detailed Description and Claims, which follow.

BRIEF DESCRIPTION OF THE DRAWINGS

Various aspects and advantages of the invention will become apparent upon review of the following detailed description and upon reference to the drawings, in which.

DETAILED DESCRIPTION

Figure 1:
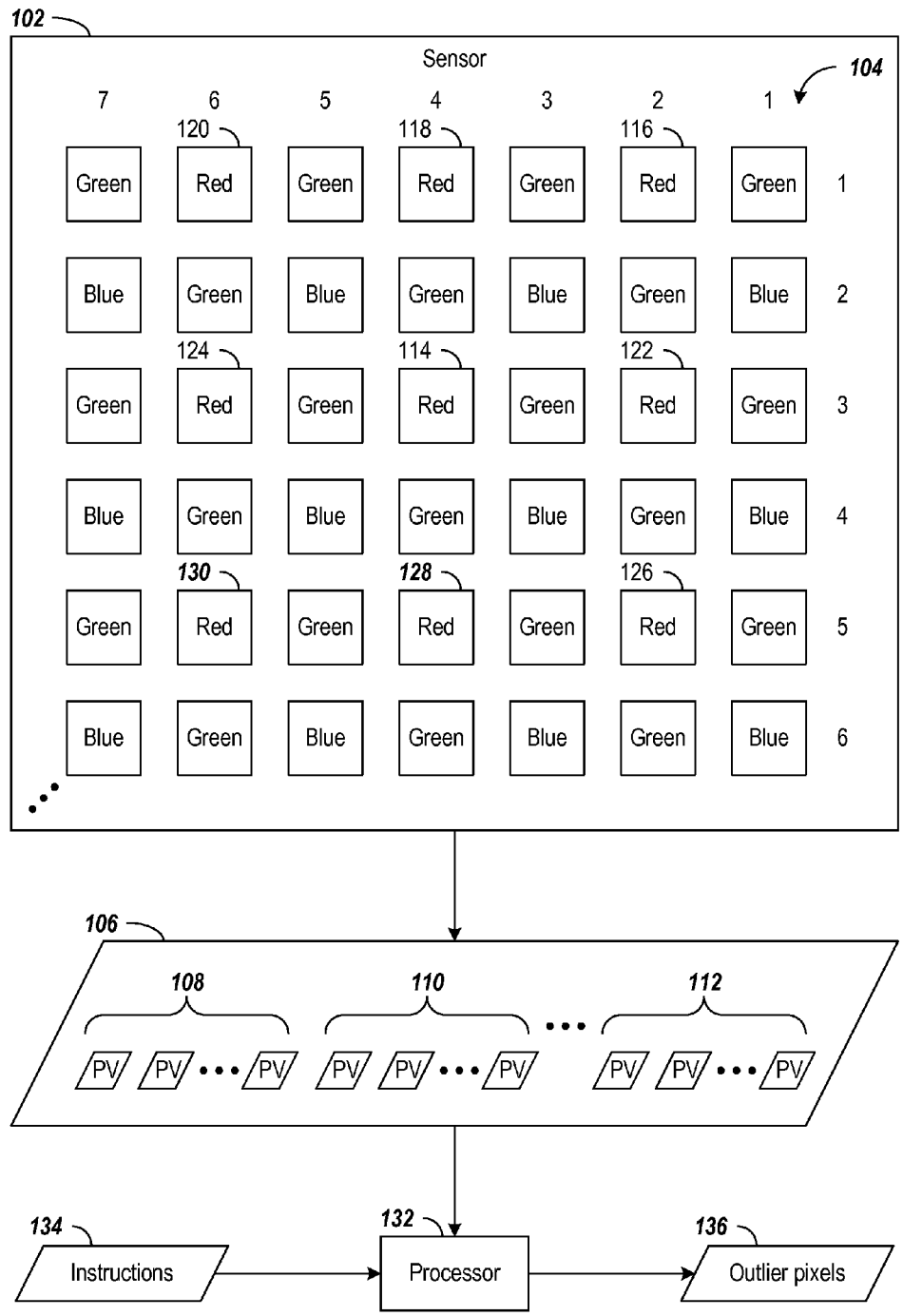
FIG. 1 is a dataflow diagram of a system for processing outlier pixels in accordance with one or more embodiments.

FIG. 1 is a dataflow diagram of a system for processing outlier pixels in accordance with one or more embodiments. In certain embodiments, an image sensor 102 has an array 104 of pixel detectors and some of the pixel detectors are defective and produce distracting image artifacts, such as a pixel that always has a bright value even when a uniformly dark scene illuminates the image sensor 102. The outlier pixels identify these defective pixel detectors to permit masking of the distracting image artifacts.

In one embodiment, the sensor 102 is a color video image sensor that includes the pixel detectors in an array 104 of rows and columns of the pixel detectors. The row and column of each pixel detector identifies a corresponding pixel. The sensor 102 is a video sensor because it produces a video stream 106 that includes a temporal sequence of image frames 108, 110, through 112, with each frame 108, 110, through 112 including a pixel value from each of the pixel detectors in array 104. The sensor 102 is a color sensor because a color filtering array covers the sensor 102 and the color filtering array causes each pixel detector in array 104 to detect an intensity of an associated color. In FIG. 1, the color filtering array uses a red-green-blue color system. In other embodiments, the color filtering array uses another color system, such as red-yellow-blue or cyan-magenta-yellow.

In one example for a color video image sensor, pixel detector 114 detects the color red and is defective. Various embodiments identify the pixel corresponding to pixel detector 114 as an outlier pixel from the pixel value of this pixel in frames 108, 110, through 112 and the pixel values in these frames of the nearby pixels corresponding to red pixel detectors 116, 118, 120, 122, 124, 126, 128, and 130.

In one embodiment, processor 132 is programmed with instructions 134 to perform operations for processing video stream 106 to generate the list of outlier pixels 136. In another embodiment, processor 132 is configured to execute instructions 134 that cause processor 132 to perform operations on video stream 106 for processing the outlier pixels 136. The operations include determining the outlier pixels 136 and masking image artifacts from the outlier pixels 136 by replacing the pixel value of each outlier pixel in each frame 108, 110, through 112 with an interpolation of the pixel values of the nearby pixels in the frame.

Figure 2:
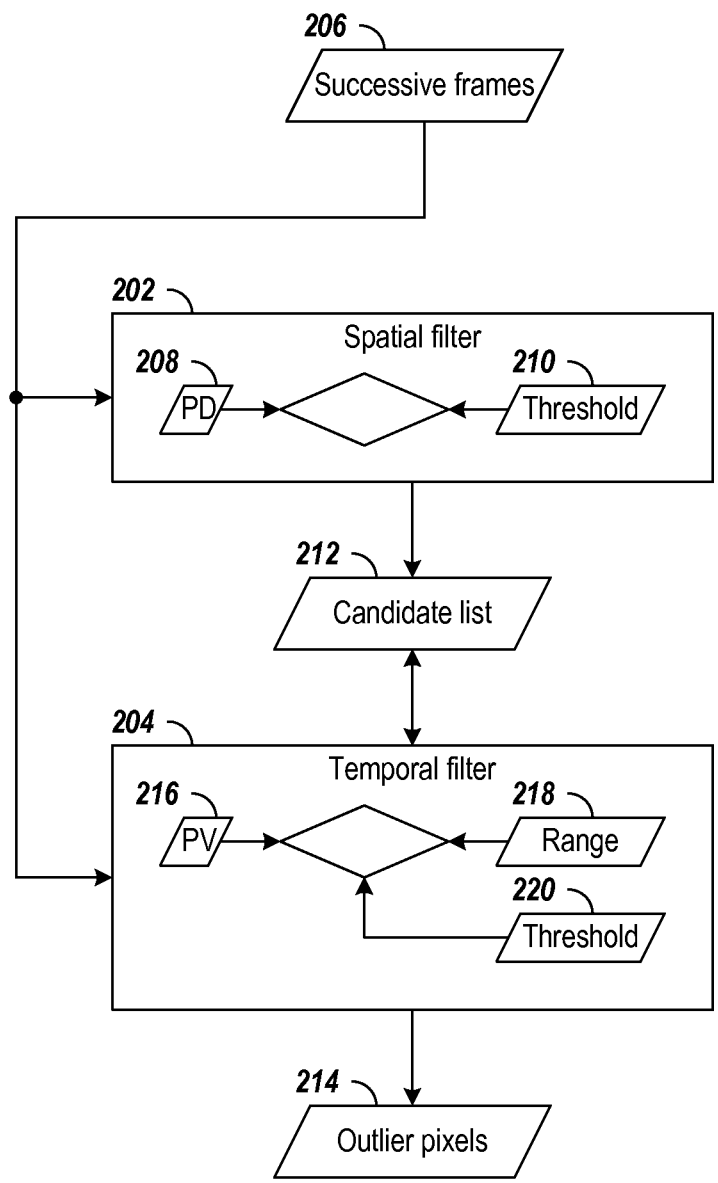
FIG. 2 is a dataflow diagram of a circuit for processing outlier pixels in accordance with one or more embodiments.

FIG. 2 is a dataflow diagram of a circuit for processing outlier pixels in accordance with one or more embodiments. A spatial filter 202 and a temporal filter 204 process the successive frames 206 of pixel values for the pixels. The spatial filter 202 processes spatial information within each of the successive frames 206 and the temporal filter 204 processes temporal information between the successive frames 206.

The spatial filter 202 computes a pixel difference 208 for each pixel within each of the successive frames 206. For each of the successive frames 206, the pixel difference 208 for a pixel is a function of the pixel value of the pixel in the successive frame and the pixel value of nearby pixels within this same frame. When the pixel difference 208 exceeds a threshold value 210, the spatial filter 202 dynamically adds the corresponding pixel to the candidate list 212. However, the spatial filter 202 does not add a pixel to the candidate list 212 when the pixel is already in the candidate list 212.

In one embodiment, the spatial filter 202 computes eight positive-valued differences between the pixel value of each pixel in each frame and the pixel values of eight nearby pixels in the frame, and divides the minimum of these eight positive-valued differences by a standard deviation of the pixel values of the eight nearby pixels in the frame. The result of this division is the pixel difference 208 for the pixel in the frame. Thus, the pixel difference 208 indicates how much the pixel differs from the eight nearby pixels. It will be appreciated that the spatial filter 202 does not discern that a pixel value comes from a defective detector when the pixel value blends in with the eight nearby pixels; however, there is no image artifact to mask when a pixel value blends in with its surrounding pixels.

Because spatial filter 202 needs pixel values from only a few rows of pixel detectors to calculate each pixel difference 208, the spatial filter 202 identifies candidate pixels to add to list 212 using a compact data set of the pixel values from only a few rows of pixel detectors. As the computing of each pixel difference 208 proceeds from the pixels for one row to the pixels for a subsequent row, the spatial filter 202 replaces the oldest row of pixel values in the compact data set with the pixel values for a new row. Thus, spatial filter 202 efficiently identifies candidate pixels to add to list 212 in a single pass through a compact data set including a few rows of the pixel values from each frame, and without considering any temporal changes between successive frames 206. This compact data set permits identifying pixels to add to candidate list 212 by storing the compact data set in a small memory that stores limited information from the current frame rather than extensive information from multiple frames. In addition, the candidate list 212 is efficiently stored in a small memory because spatial filter 202 generally identifies few pixels as potential outlier pixels.

The temporal filter 204 either validates that a pixel in the candidate list 212 is one of the outlier pixels 214 or the temporal filter 204 dynamically removes the pixel from the candidate list 212. Generally the spatial filter 202 can again dynamically add a pixel to the candidate list 212 after the temporal filter 204 has dynamically removed the pixel from the candidate list 212.

In one embodiment, the spatial filter 202 adds a pixel to the candidate list 212 along with the pixel value of the pixel in the current frame, and this pixel value becomes a baseline value for the pixel. The temporal filter 204 checks whether the pixel value 216 of the pixel in each of the successive frames 206 lies within a range 218 encompassing this baseline value. If the pixel value 216 is outside the range 218 in any of the successive frames 206, this divergence causes the temporal filter 204 to remove the pixel from the candidate list 212. If the pixel value 216 lacks such divergence over many successive frames 206, the corresponding pixel is added to the outlier pixels 214.

In one embodiment, the temporal filter 204 counts the number of successive frames 206 that the pixel value 216 is within the range 218. The temporal filter 204 determines the corresponding pixel is in the outlier pixels 214 after the pixel value 216 has been stuck within the range 218 over a predetermined number 220 of successive frames 206 in the stream of video images.

In one embodiment, the temporal filter 204 updates the range 218 and/or its baseline value during the processing of each of the successive frames 206 of the video stream. In one example, the baseline value is a moving average and the range 218 is reduced when the candidate list 212 includes more than an upper limit on the acceptable number of pixels in the candidate list 212, and the range 218 is increased when the candidate list 212 includes less than a similar lower limit. These upper and lower limits on the acceptable number of pixels in the candidate list 212 are predetermined parameters in one embodiment.

In one embodiment, the temporal filter 204 updates the threshold value 220 during the processing of each of the successive frames 206 of the video stream. In one example, the threshold value 220 is increased when the outlier pixels 214 include more than an upper limit on the acceptable number of outlier pixels 214, and the threshold 220 is reduced when the outlier pixels 214 include less than a similar lower limit. These upper and lower limits on the acceptable number of outlier pixels 214 are predetermined parameters in one embodiment.

Figure 3:
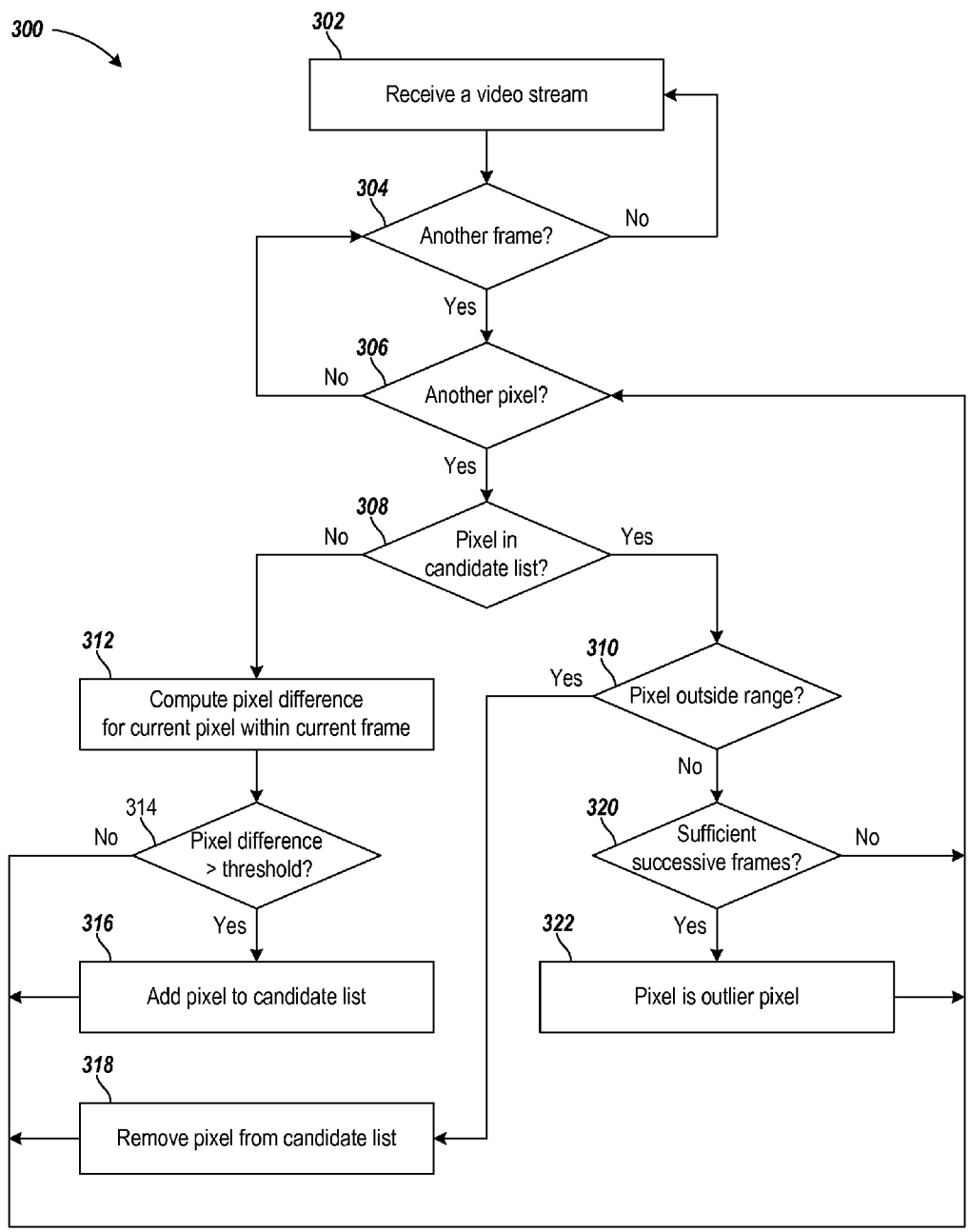
FIG. 3 is a flow diagram of a process for processing outlier pixels in accordance with one or more embodiments.

FIG. 3 is a flow diagram of a process 300 for processing outlier pixels in accordance with one or more embodiments. Spatial information within each frame identifies candidate pixels and temporal information between frames validates that certain of the candidate pixels are outlier pixels.

At step 302 a video stream including a sequence of frames is received. Decision 304 checks whether the video stream includes another frame, and decision 306 checks whether the current frame includes another pixel needing processing. If the current frame includes another pixel needing processing, process 300 proceeds to decision 308.

Decision 308 checks whether the current pixel is already in the candidate list. If the current pixel is already in the candidate list then process 300 proceeds to decision 310 to determine whether the pixel is an outlier pixel. Otherwise, process 300 proceeds to step 312 to check whether the pixel should be added to the candidate list.

At step 312, a pixel difference is computed for the current pixel in the current frame. The pixel difference is a function of the pixel value of the pixel and the pixel values of nearby pixels within the frame. Decision 314 checks whether the pixel difference exceeds a threshold value. If the pixel difference is greater than the threshold value then the pixel is dynamically added to the candidate list at step 316; otherwise, process 300 returns to decision 306 to process the next pixel.

Decision 310 checks whether the pixel value of the current pixel in the current frame has diverged from its baseline value established in preceding frames because the pixel value is outside a range encompassing the baseline value. If the pixel value of the current pixel in the current frame is outside the range, the current pixel is dynamically removed from the candidate list at step 318 and process 300 returns to decision 306 to process the next pixel. Otherwise, process 300 proceeds to decision 320. Decision 320 checks whether the current pixel has not diverged for a sufficient number of successive frames for the current pixel to become an outlier pixel at step 322. If the current pixel has not been stuck within the range for a sufficient number of frames, process 300 returns to decision 306, and the current pixel might later become an outlier pixel when the current pixel is again processed in the next frame.

Figure 4:
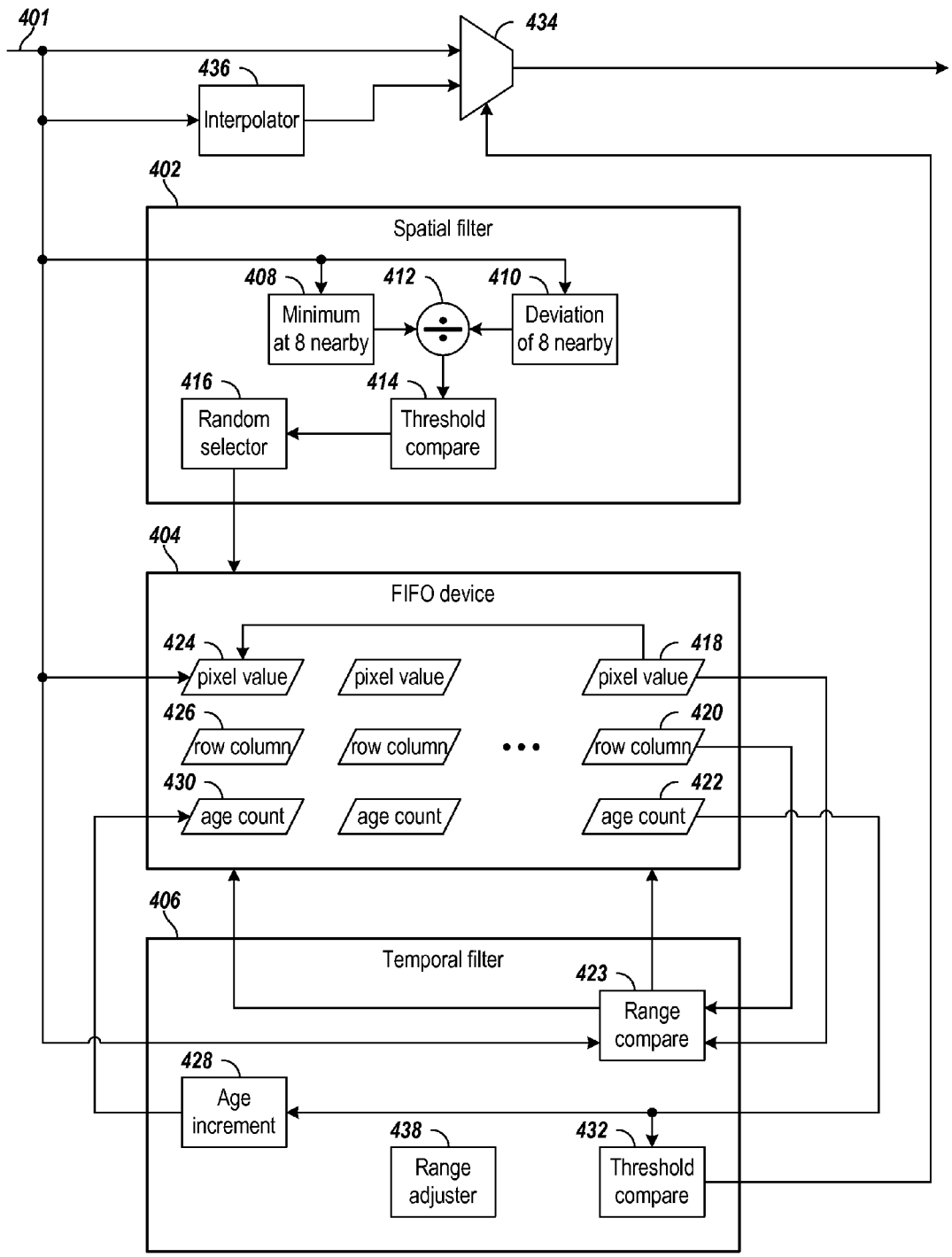
FIG. 4 is a block diagram of a circuit for processing outlier pixels in accordance with one or more embodiments.

FIG. 4 is a block diagram of a circuit for processing outlier pixels in accordance with one or more embodiments. The spatial filter 402 adds pixels to a candidate list stored in FIFO device 404, and the temporal filter 406 circulates the candidate list through the FIFO device 404 once for each frame of the video stream.

The spatial filter 402 includes a minimum circuit 408 and a deviation circuit 410. The minimum circuit 408 computes a numerator for the division circuit 412 and the deviation circuit 410 computes a denominator for the division circuit 412. The numerator from minimum circuit 408 is a minimum of eight positive-valued differences between the pixel value on line 401 for each pixel in each frame and the pixel values of eight pixels that are nearby the current pixel in the current frame. The denominator from deviation circuit 410 is a standard deviation of the eight nearby pixels in the current frame.

The division circuit 412 calculates a pixel difference for each pixel of each frame by dividing the numerator from minimum circuit 408 by the denominator from deviation circuit 410. The threshold comparison circuit 414 determines whether the pixel difference exceeds a threshold value.

In one embodiment, each of the eight positive-valued differences between the value of the current pixel in the frame and the values of the eight nearest neighbor pixels in the frame is an absolute value or a square of the difference between the pixel values.

In other embodiments, the spatial filter 402 computes more or fewer than eight differences between the pixel value of each pixel in each frame and nearby pixels in the frame. Various approaches normalize these differences. These approaches include dividing a numerator by a denominator, and calculating the numerator that is an absolute value or square of a minimum, maximum, or median of the differences or an average or sum or sum of squares of the differences, and calculating the denominator that is a standard deviation or variance of the differences.

The FIFO device 404 has a limited capacity for storing each element in the candidate list. When the threshold comparison circuit 414 identifies many candidate pixels to add to the candidate list for the first frame processed, the FIFO device 404 becomes full before the whole frame is analyzed. The random selection circuit 416 randomly selects a subset of the candidate pixels from threshold comparison circuit 414. Thus, threshold comparison circuit 414 randomly selects an order to dynamically add pixels to the candidate list in FIFO device 404. This ensures that when the FIFO device 404 becomes full, the stored candidate list contains pixels randomly distributed across the rows and columns for the frames.

The FIFO device 404 stores an element for each pixel in the candidate list, and each element includes a baseline pixel value, a row and column identifier, and an age count. For example, a next element read from the FIFO device 404 includes baseline pixel value 418, a row and column identifier 420, and an age count 422.

The elements in the candidate list are stored in the FIFO device 404 in the order the pixels are sensed by a sensor. Thus, the current pixel having the pixel value on line 401 is not in the candidate list unless the row and column identifier 420 of the next element in the candidate list matches the row and column of the current pixel. The temporal filter 406 compares the row and column identifier 420 and the row and column of the current pixel, and if the row and column identifier 420 does not match the row and column of the current pixel, the reading of the next element from the FIFO device 404 is postponed.

When the row and column identifier 420 does match the row and column of the current pixel having the pixel value on line 401, the temporal filter 406 reads the next element from the FIFO device 404. After this, the next element read from the FIFO device 404 is advanced. The temporal filter 406 then compares the baseline pixel value 418 and the current pixel value on line 401.

If the current pixel value on line 401 does not diverge from the baseline pixel value 418 because the current pixel value on line 401 is inside a range encompassing the baseline pixel value 418, then range comparison circuit 423 writes this element back into FIFO device 404 by respectively writing the baseline pixel value 418 and the identifier 420 to the baseline pixel value 424 and the identifier 426 of a previously empty element in the FIFO device 404. In addition, the age count 422 of this next element is incremented by age increment circuit 428 and range comparison circuit 423 writes this updated age count to age count 430 of the previously empty element in the FIFO device 404.

If the current pixel value on line 401 does diverge from the baseline pixel value 418, then the next element including baseline pixel value 418, identifier 420, and an age count 422 is not written back into FIFO device 404, discarding the element from the candidate list.

When the temporal filter 406 is circulating the next element read from the FIFO device 404 into the FIFO device 404, this overrides the spatial filter 402 attempting to add an element to the candidate list. This prevents multiple instances of the same pixel in FIFO device 404 and prevents the spatial filter 402 from reinitializing an existing element for the pixel. However, when the temporal filter 406 is not circulating the next element into a previously empty element, the FIFO device 404 does not already store an element for the current pixel, and the spatial filter 402 can add a new element to the candidate list so long as the FIFO device 404 is not already full. The spatial filter 402 adds this new element to the candidate list when the threshold comparison circuit 414 determines the pixel difference for the pixel value on line 401 exceeds the threshold and random selection circuit 416 selects the current pixel. The spatial filter 402 creates the new element in the candidate list with the baseline pixel value 424 initialized to the current pixel value on line 401, the row and column identifier 426 initialized to the identifier of the corresponding pixel, and the age count 430 initialized to zero.

When the age count 422 reaches a threshold value, threshold comparison circuit 432 determines the corresponding pixel is an outlier pixel and directs multiplexer 434 to replace the pixel value on line 401 with an interpolation of the pixel values of the nearby pixels in the frame. In one embodiment, interpolator 436 generates the interpolation from the pixel values of the eight nearby pixels in the frame. This masks the image artifacts caused by a defective pixel detector.

In one embodiment, age increment circuit 428 saturates at the threshold value of threshold comparison circuit 432 to continue identifying the current pixel as an outlier pixel unless and until the pixel value on line 401 diverges from the baseline pixel value 418 for the outlier pixel. A possible threshold value is the square root of a maximum possible value for the pixel value on line 401. In one example, a pixel detector becomes defective during extreme operating conditions, such as high sensor temperature, and the corresponding pixel is dynamically added to the candidate list and eventually identified as an outlier pixel during these extreme operating conditions. However, after the pixel value diverges from the baseline value because the pixel detector begins operating properly when operating conditions moderate, the corresponding pixel is dynamically removed from the candidate list and interpolation ceases for this pixel. The corresponding pixel is again dynamically added to the candidate list when operating conditions degrade and the pixel detector again becomes defective.

Range adjuster 438 updates the range used by range comparison circuit 423. The range is reduced when the number of elements in the FIFO device 404 is more than a predetermined target number and the range is increased when the number of elements in the FIFO device 404 is less than another predetermined target number.

The embodiments of the present invention are thought to be applicable to a variety of systems for determining outlier pixels. Other aspects and embodiments will be apparent to those skilled in the art from consideration of the specification and practice of the invention disclosed herein. The embodiments may be implemented as one or more processors configured to execute software, as an application specific integrated circuit (ASIC), or as a logic on a programmable logic device. It is intended that the specification and illustrated embodiments be considered as examples only, with a true scope and spirit of the invention being indicated by the following claims.

What is claimed is:

1. A circuit for processing outlier pixels, comprising:
   a spatial filter configured to compute, for each pixel, a pixel difference as a function of a pixel value of the pixel and pixel values of a plurality of nearby pixels within each frame, and to dynamically add the pixel to a candidate list in response to the pixel difference exceeding a threshold value; and
   a temporal filter coupled to the spatial filter, wherein:
      for each pixel in the candidate list, the temporal filter dynamically removes the pixel from the candidate list in response to a divergence of the pixel value of the pixel from values of the pixel in a plurality of successive frames; and
      for each pixel in the candidate list, the temporal filter determines that the pixel is an outlier pixel in response to a lack of the divergence in the successive frames.

2. The circuit of claim 1, further comprising:
   a sensor coupled to the spatial and temporal filters,
   wherein the sensor produces a video stream that includes each frame and the sensor defectively detects a pixel of the video stream, and the spatial and temporal filters determine the pixel is an outlier pixel.

3. The circuit of claim 2, further comprising:
   an interpolator coupled to the temporal filter,
   wherein the interpolator replaces the pixel value of each outlier pixel in each frame with an interpolation of the pixel values of the nearby pixels in the frame.

4. The circuit of claim 1, further comprising a FIFO device coupled to the spatial and temporal filters, the FIFO device storing an element for each pixel in the candidate list.

5. The circuit of claim 4, wherein an order of elements in the FIFO device matches a sensing order for each pixel within each frame.

6. The circuit of claim 4, wherein, for each frame:
   the spatial filter is configured to create the element in the FIFO device in response to the pixel difference of the pixel exceeding the threshold value and the FIFO device not already storing the element;
   the spatial filter is further configured to create the element to include a count initialized to zero and a baseline value initialized to the pixel value of the pixel; and
   the temporal filter is configured to read each element in the FIFO device, discard the element in response to the divergence of the pixel value of the pixel in the frame being outside a range encompassing the baseline value, and write the element back into the FIFO device with the count incremented in response to the lack of the divergence from the pixel value being within the range.

7. The circuit of claim 6, wherein:
   the temporal filter determines a pixel in the candidate list is an outlier pixel in response to the count of the element for the pixel exceeding another threshold value;
   the another threshold value is increased in response to a number of the outlier pixels being more than a predetermined upper limit; and
   the another threshold value is reduced in response to the number of the outlier pixels being less than a predetermined lower limit.

8. The circuit of claim 1, wherein the spatial filter randomly selects an order to dynamically add a plurality of pixels to the candidate list until the candidate list becomes full.

9. The circuit of claim 1, wherein:
the spatial filter computes the pixel difference for each pixel of each frame to be a numerator divided by a denominator;
the numerator is a minimum one of eight positive-valued differences between the pixel value of the pixel in the frame and each of the pixel values of the nearby pixels in the frame; and
the denominator is a standard deviation of the pixel values of the nearby pixels in the frame.

10. The circuit of claim 9, wherein:
each of the eight positive-valued differences is a square of a difference between the pixel value of the pixel and one of the pixel values of the nearby pixels; and
the threshold value is a square root of a maximum possible value for the pixel value.

11. The circuit of claim 9, wherein:
each pixel is associated with one of a plurality of colors of a color filtering array covering a sensor that produces a video stream that includes each frame; and
the nearby pixels for each pixel are eight nearest neighbor pixels associated with the color that is associated with the pixel.

12. The circuit of claim 1, wherein:
for each pixel in each frame having the pixel difference exceeding the threshold value, the spatial filter dynamically adds a baseline value into the candidate list, the baseline value being the pixel value of the pixel in the frame; and
the temporal filter compares the baseline value from the candidate list with the pixel value of the pixel in the successive frames to determine whether the pixel value has the divergence in the successive frames.

13. The circuit of claim 12, wherein:
the divergence for each pixel in the candidate list for each successive frame is the pixel value of the pixel in the successive frame being outside a range encompassing the baseline value; and
the range of pixel values is reduced in response to the candidate list including more than a first predetermined number of pixels and the range of pixel values is increased in response to the candidate list including less than a second predetermined number of pixels.

14. A method for processing outlier pixels, comprising:
using at least one programmed processor to perform operations including:
computing a pixel difference for each pixel within each frame of a video stream as a function of a pixel value of the pixel and pixel values of a plurality of nearby pixels within the frame;
dynamically adding the pixel to a candidate list in response to the pixel difference exceeding a threshold value;
dynamically removing each pixel in the candidate list from the candidate list in response to a divergence of the pixel value of the pixel from values of the pixel in a plurality of successive frames; and
determining each pixel in the candidate list is an outlier pixel in response to a lack of the divergence in the successive frames.

15. The method of claim 14, wherein:
the computing of the pixel difference for each pixel within each frame of the video stream includes calculating a numerator and a denominator and dividing the numerator by the denominator;
the numerator is a minimum one of eight positive-valued differences between the pixel value of the pixel in the frame and each of the pixel values of the nearby pixels that are eight nearby pixels in the frame; and
the denominator is a standard deviation of the pixel values of the eight nearby pixels in the frame.

16. The method of claim 14, wherein the determining that each pixel in the candidate list is an outlier pixel includes:
initializing a count for the pixel in response to the pixel difference of the pixel exceeding the threshold value in a frame;
incrementing the count in response to the lack of the divergence of the pixel value of the pixel in each successive frame being within a range; and
determining the pixel is an outlier pixel in response to the count exceeding another threshold value.

17. The method of claim 14, further comprising replacing the pixel value of each outlier pixel in each frame with an interpolation of the pixel values of the nearby pixels in the frame.

18. A system for processing outlier pixels, comprising:
at least one processor configured to execute instructions that cause the at least one processor to perform operations including:
computing a pixel difference for each pixel within each frame of a video stream as a function of a pixel value of the pixel and pixel values of a plurality of nearby pixels within the frame;
dynamically adding the pixel to a candidate list in response to the pixel difference exceeding a threshold value;
dynamically removing each pixel in the candidate list from the candidate list in response to a divergence of the pixel value of the pixel from values of the pixel in a plurality of successive frames;
determining each pixel in the candidate list is an outlier pixel in response to a lack of the divergence in the successive frames.

19. The system of claim 18, wherein:
the computing of the pixel difference for each pixel within each frame of the video stream includes:
calculating a numerator and a denominator and dividing the numerator by the denominator;
wherein the numerator is a minimum of eight positive-valued differences between the pixel value of the pixel in the frame and each of the pixel values of the nearby pixels that are eight nearby pixels in the frame; and
wherein the denominator is a standard deviation of the pixel values of the eight nearby pixels in the frame; and
the determining that each pixel in the candidate list is an outlier pixel includes:
initializing a count for the pixel in response to the pixel difference of the pixel exceeding the threshold value in a frame;
incrementing the count in response to the lack of the divergence of the pixel value of the pixel in each successive frame being within a range; and
determining the pixel is an outlier pixel in response to the count exceeding another threshold value.

20. The system of claim 18, wherein the operations further include replacing the pixel value of each outlier pixel in each frame with an interpolation of the pixel values of the nearby pixels in the frame.

* * * * *